United States Patent [19]

Carlomagno et al.

[11] Patent Number: 5,330,549
[45] Date of Patent: Jul. 19, 1994

[54] APPARATUS FOR THE MANUFACTURE OF SHEETS OF GLASS HAVING A COMPLEX SHAPE

[75] Inventors: Giovanni Carlomagno; Vincenzo Caico, both of Naples; Edoardo Tereo, San Salvo, all of Italy

[73] Assignee: Societa Italiana - SIV - S.p.A., San Salvo, Italy

[21] Appl. No.: 911,939

[22] Filed: Jul. 10, 1992

[30] Foreign Application Priority Data

Jul. 10, 1991 [IT] Italy ................ 91A000504

[51] Int. Cl.⁵ .................. C03B 23/03; C03B 23/035
[52] U.S. Cl. .................. 65/182.2; 65/25.4; 65/268; 65/273; 65/289
[58] Field of Search ............. 65/25.4, 104, 106, 182.2, 65/268, 273, 289

[56] References Cited

U.S. PATENT DOCUMENTS

| | | |
|---|---|---|
| 3,223,501 | 12/1965 | Fredley et al. ............ 65/182.2 |
| 3,468,645 | 9/1969 | McMaster et al. ............ 65/25.4 |
| 3,869,271 | 3/1975 | Shaffer et al. . |
| 4,204,853 | 5/1980 | Seymour . |
| 4,285,715 | 8/1981 | Frank . |
| 4,508,556 | 4/1985 | Bennett et al. . |
| 4,596,592 | 6/1986 | Frank . |
| 5,066,321 | 11/1991 | Kramer et al. ............ 65/182.2 |

FOREIGN PATENT DOCUMENTS

| | | |
|---|---|---|
| 0005306 | 11/1979 | European Pat. Off. . |
| 0415826 | 3/1991 | European Pat. Off. . |
| 0520886 | 12/1992 | European Pat. Off. . |
| 2400296 | 7/1974 | Fed. Rep. of Germany . |
| 3819503 | 7/1989 | Fed. Rep. of Germany . |
| 2528819 | 1/1983 | France . |
| WO90/11973 | 3/1990 | PCT Int'l Appl. . |
| WO92/01639 | 7/1991 | PCT Int'l Appl. . |

Primary Examiner—Joye L. Woodward
Attorney, Agent, or Firm—Wenderoth, Lind & Ponack

[57] ABSTRACT

An apparatus and a process as disclosed for manufacturing a glass sheet having a complex form for vehicles. The apparatus includes a roller heating oven, a supporting air bed in a shaping section, and a shaping ring for conveying the glass first to an upper shaping mold and then to a tempering station. The air bed is formed with fustoconical nozzles of such a size as to enable the ring to pass through them and to be placed beneath the a floating plane of the glass. The ring undergoes a first vertical movement to lift the glass toward the shaping mold and a second horizontal movement to convey the glass to the tempering station.

11 Claims, 4 Drawing Sheets

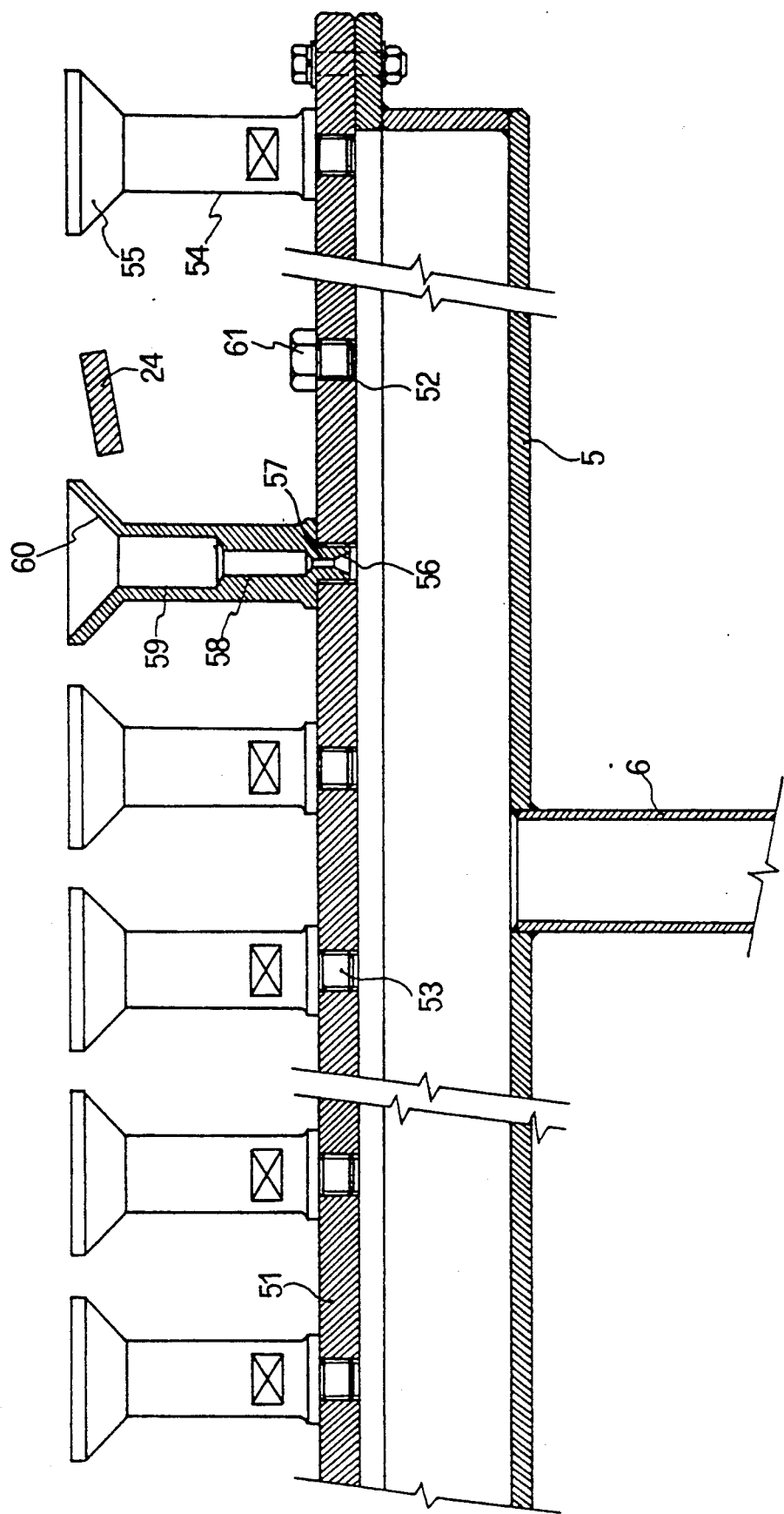

APPARATUS FOR THE MANUFACTURE OF SHEETS OF GLASS HAVING A COMPLEX SHAPE

BACKGROUND OF THE INVENTION

1. Field of the Invention

The present invention relates to an apparatus and process for shaping and tempering sheets of glass having a complex shape, for use as windows in vehicles.

The shape of the bodywork of a motor vehicle is of great importance, not only from an aesthetic point of view, but also from an aerodynamic one. In this context, it is also necessary that there be no surface discontinuity which would worsen the vehicle's air penetration coefficient when in movement.

For this reason glasses for automobiles in particular have taken on complex forms which can only be manufactured in specially produced plants built for the purpose.

Industrial plants for shaping and tempering sheets of glass with complex forms for use in motor vehicles are known from the state of the art.

2. Description of the Prior Art

U.S. Pat. No. 4,285,715 describes a plant which heats the glass, conveyed on rollers, in a horizontal oven and, again on rollers, transports it to a shaping station. A lower vertically mobile mold, whose flat surface is grooved so as to pass through the rollers transporting the glass, lifts the glass from the rollers and carries it upwards until the glass is close enough to be attracted to the upper mold by means of vacuum suction. When shaping has been completed the upper mold allows the glass to drop onto a ring-like member, called a shuttle, running horizontally, which transports the glass to the tempering and cooling station.

The disadvantage in this plant lies mainly in the fact that the glass, which is at a high temperature, suffers surface deformation due to the long period of contact first with the rollers in the shaping area, and then with the flat surface of the mold. The surface deformation causes notable optical faults which are unacceptable for glass to be used in motor vehicles.

U.S. Pat. No. 4,508,556 describes a method and an apparatus for shaping sheets of glass having complex shapes. The sheets of glass move along a gaseous hearth bed through a horizontal heating oven, drawn by transversal bars separated by a given space, and reach the shaping station. In this area, a hearth formed by a gaseous bed takes up the glass and bears it in its horizontal movement. Because the hearth has a suitable downward causes, it curves the glass to become curved due to gravity into a desired shape. A hollow shaping ring, of the configuration desired, surrounds the gaseous bed and is positioned below the bed. When the whole surface of the glass is resting on the gaseous bed, the ring lifts it vertically towards a mold, to which the glass is attracted by vacuum suction, and which successively deposits the glass on a second shuttle carriage ring which carries it to the tempering and cooling station.

In this plant there are several disadvantages: first of all it is necessary to change, for production of each shape, not only the lower ring and the upper mold, but also the gaseous hearth bed, which has a curvature similar to that of the finished article; the gaseous hearth bed must also be changed in relation to the surface dimensions of the article, as it must be housed within the hollow shaping ring; and the transfer from the oven to the shaping station takes place by means of intermediate rollers which, given the high temperature of the glass, can easily cause surface deformation and therefore optical defects.

The European patent application EP 415,826 describes a plant which attempts to overcome the disadvantages deriving from the presence of rollers in the curving station, substituting the rollers with a belt of suitable heat-resistant material which is placed between a lower shaping ring and an upper vacuum mold.

In this case also there are certain disadvantages, deriving mainly from the difficulties in controlling such a complex shaping system, and from the fact that prolonged standing of the glass, heated to softening temperature, on the support belt can easily cause unpleasant optical deformations.

SUMMARY OF THE INVENTION

The object of the present invention is that of providing an apparatus capable of overcoming the above mentioned disadvantages, and capable of manufacture at highly competitive production costs.

The objects of the present invention are obtained by means of an apparatus comprising: a horizontal heating furnace in which the glass is transported on rollers throughout its length; a shaping station, maintained at the same temperature as the furnace, provided with an air hearth bed to support the glass; and a lower shaping ring which, as well as participating in the glass shaping process along with the upper mold, also performs the horizontal transportation of the glass towards the tempering nozzles, thus also acting as a shuttle.

Use of a roller conveyor in the furnace permits greater speed in heating the glass and lower plant costs, when compared with an air hearth bed used throughout the length of the furnace. In the latter case, the transversal bars drawing the glass along can cause imprints on the glass itself, thereby producing an increase in the number of rejects.

In the shaping station the rollers transporting and supporting the glass are substituted by an air bed. This bed is obtained by blowing hot air through a number of nozzles arranged in such a way as to permit uniform support of the sheet of glass and to allow the shaping ring-shuttle to cross the floating level of the glass and position itself under the glass.

The term hot air is intended to mean both heated air and a mixture of air and burnt gasses, deriving for example from the combustion of methane.

The height of the nozzles is such as to allow the shaping ring, often having a large radius, to descend below the support level. The form, number and arrangement of the nozzles is such as to allow uniform support of the glass, except in correspondence with the area which is not provided with nozzles, necessary to allow the shaping ring to pass; the area is easily obtained by removing the nozzles situated therein and closing the corresponding holes with suitable threaded plugs, said nozzles having threaded cylindrical stems so that they can be screwed into the holes in a plenum.

According to a preferred embodiment of the invention the internal geometry of the nozzle, capable of allowing the passage of air in such a way as to provide suitable support to the sheet of glass, is made up of a converging channel to decrease the pressure drop caused by the inlet; a cylindrical portion with calibrated cross-section so as to obtain a substantially constant flow rate for each nozzle; a long channel with a larger diameter than the preceding cylindrical portion and preferably diverging so as to slow down the fluid stream; and final part with a frusto-conical configuration to provide final slowing of the fluid and consequently to give a flat flow of pressure at the outlet section of the nozzle.

The cylindrical portion with the calibrated cross-section preferably has a diameter from 2 to 8 mm.

The diameter of the outlet section of the nozzle is preferably 40 to 100 mm.

The supply pressure of air to the nozzles is preferably 50 millibar to 1000 millibar, and the pressure can be adjusted during the working cycle to values between the upper and lower limits in order to vary the distance between the sheet of glass and the level of the nozzles and/or to optimize the consumption of hot air, which has a temperature preferably from 600° C. to 700° C.

The distance of the sheet of glass from the level of the nozzles is preferably 0.2 mm to 1 mm, and can vary during the working cycle, oscillating between the limit values according to the pressure of the air fed into the nozzles.

The nozzles are arranged on the plenum with their perpendicular axes at the vertexes of a triangular, or square, or rectangular mesh with a pitch such as to guarantee in any case adequate discharge space for the air between adjacent nozzles, to allow better support of the sheet of glass, especially in the case of nozzles with a large diameter outlet section.

In the vicinity of the areas where the shaping ring passes it may be advisable to use nozzles of smaller diameter, thus giving coexistence on the same plane of nozzles with different outlet section diameters, without producing any disturbance in the action of supporting the sheet of glass.

The lower shaping mold is formed by a hollow ring, which has no gaps in its profile, supported by a metal mold-bearing element which allows the ring to perform a first vertical movement from the plane below the air bed up to the upper mold and then to perform a second horizontal movement bringing the ring from the shaping station to the tempering station.

An object of the invention is therefore to provide an apparatus for the shaping and tempering of sheets of glass having a complex shape, for use as glazing in motor vehicles, comprising a heating station formed by a horizontal furnace, a shaping station immediately following the heating furnace and provided with a lower shaping ring and with an upper shaping mold, a tempering station provided with tempering nozzles to effect the rapid cooling of the sheets of glass after shaping, and with means for conveying and supporting the sheet of glass, characterized in that the means comprise, in sequence along the direction of movement of the sheets of glass: cylindrical rollers for conveying and supporting the sheets inside the heating furnace, an air hearth bed for supporting the sheets in the shaping station, and a ring for transportation of sheets in the shaping station, to move sheets vertically towards an upper shaping mold and to move the sheets horizontally for transportation toward the tempering station.

A further object of the invention is to provide a process for the shaping and tempering of sheets of glass having complex forms, for use as windscreens for motor vehicles, comprising a heating step to heat the sheet of glass, a shaping step and a tempering step, characterized in that the sheet of glass moves, during the heating step along a cylindrical roller bed, during the shaping stage first on an air hearth bed and then on a shaping ring which conveys it further horizontally toward the tempering station.

The advantages gained by the present invention are the following: the glass can remain on a hot air bed for a fairly long time without suffering notable deformation, thereby limiting optical defects, because the air flow is formed so as not to transfer heat and so as not to produce localized deformations on the surface of the glass; the air bed is flat and can therefore be used irrespective the form of the sheet of glass to be curved, thus reducing, with respect to the prior art, the costs involved in changing equipment; the same plane onto which the nozzles are screwed is used irrespective the geometric form of the piece to be shaped and; the shaping ring can cross the floating level of the sheet of glass and, for this reason, no gaps are required on the ring itself, as is necessary when rollers are present.

BRIEF DESCRIPTION OF THE DRAWINGS

Further characteristics and advantages of the present invention will become clear from the following description, given merely as a non-limiting example with reference to the accompanying drawings, in which:

FIG. 4 is a vertical cross-sectional view of a device for producing an air bed.

DESCRIPTION OF THE PREFERRED EMBODIMENT

Figure 1:
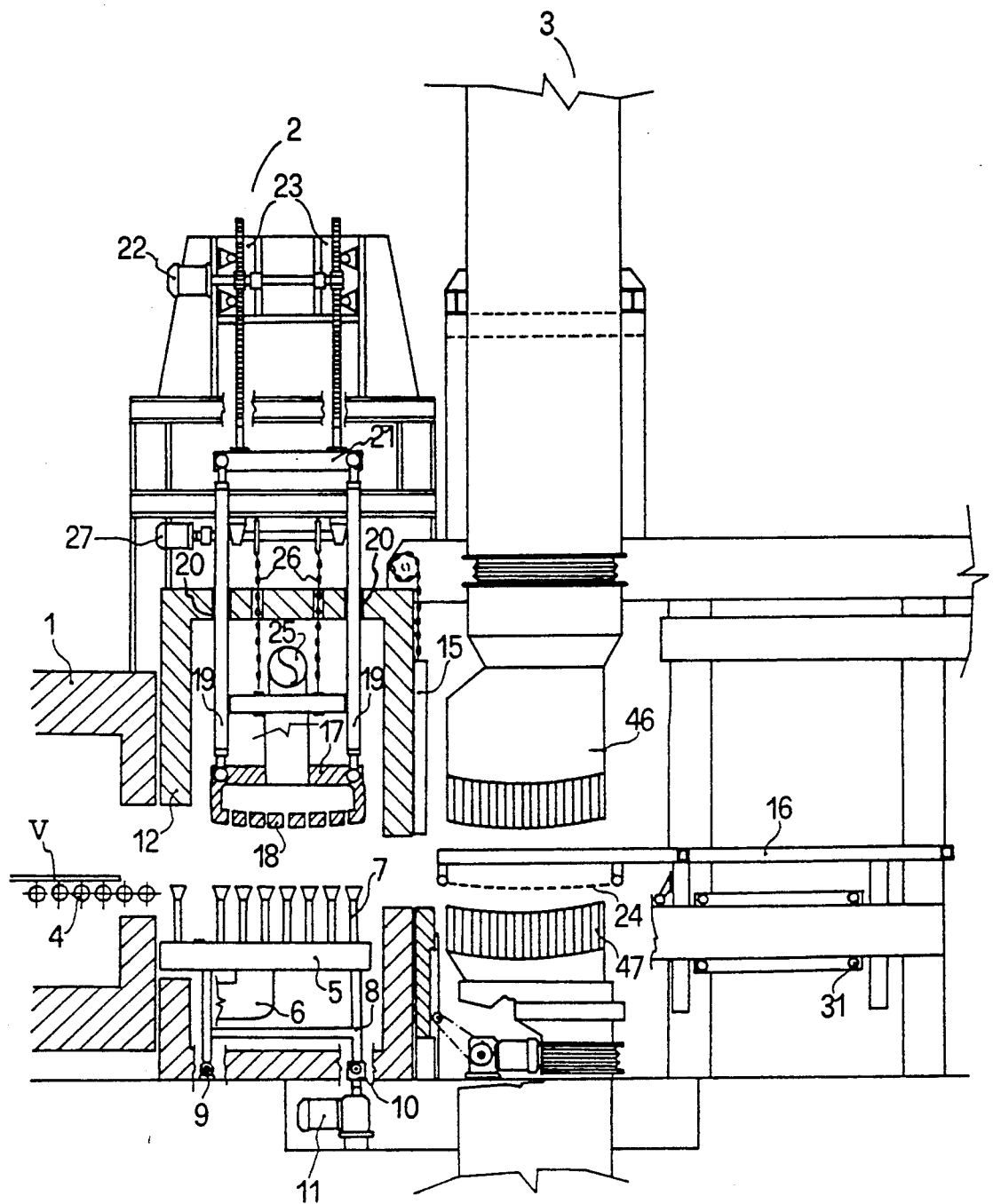
FIG. 1 shows an overall view of an apparatus according to the present invention and a vertical cross-sectional view of the shaping station.
Figure 2:
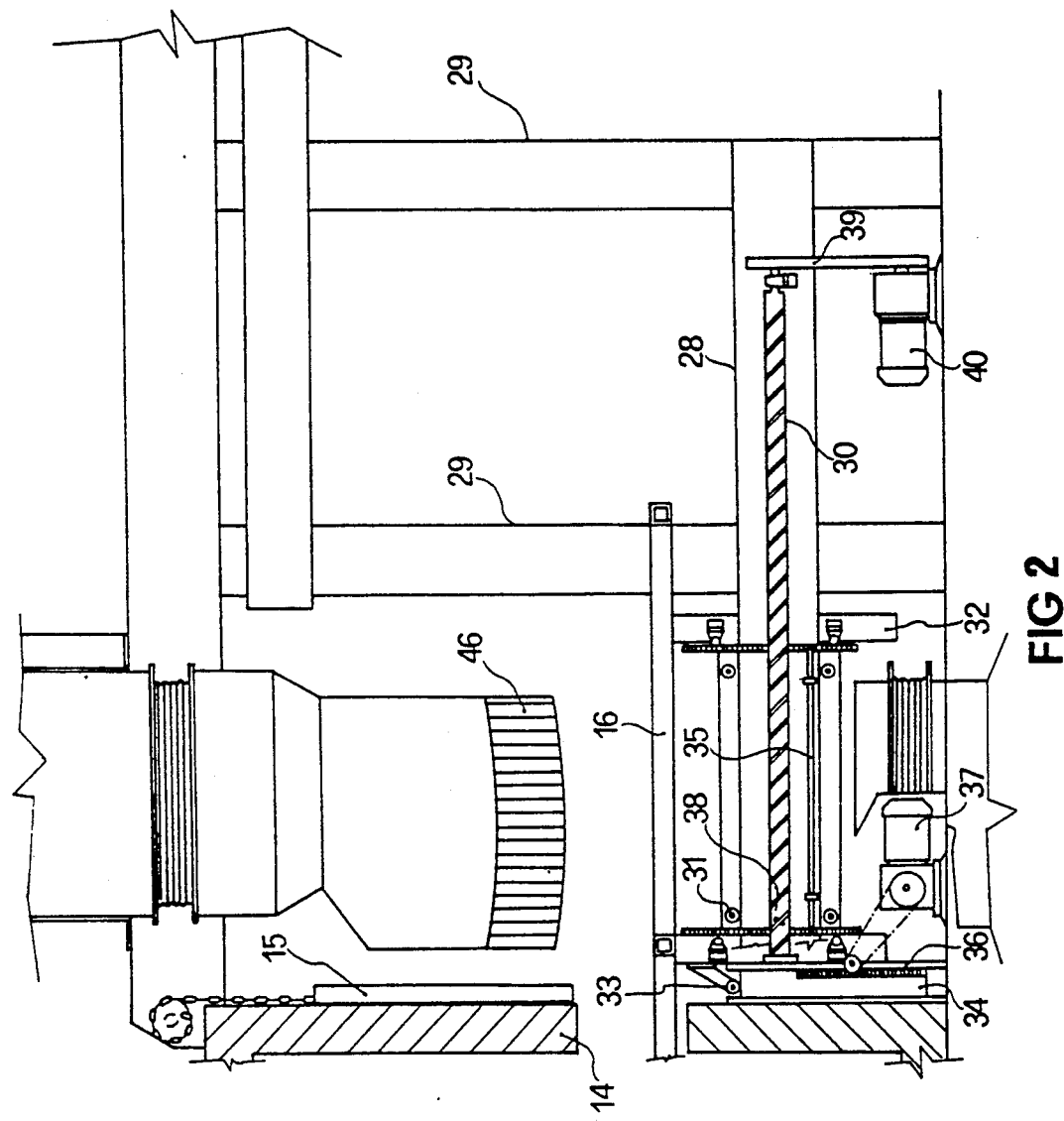
FIG. 2 is a vertical cross-sectional view of a tempering station.

The apparatus comprises a heating furnace 1, a shaping station 2, a tempering station 3 and a delivery station not shown in the drawings.

According to the present invention the heating furnace 1 brings the glass up to its softening temperature, conveying it along a horizontal path formed by a cylindrical roller bed 4, the movement of which is provided by means of an operating mechanism not shown in the figures.

The shaping station 2 is situated immediately after the horizontal furnace 1. The shaping station is contained within a hot chamber 12, the walls of which are built of refractory material and which is kept at a temperature of approximately 650° C. with the aid of electric heating elements not shown in the figures.

The control devices for the shaping operation are situated outside the chamber 12, whereas the equipment for performing the shaping is located inside the chamber.

Immediately after the outlet from the furnace 1, a plenum 5 is arranged within the hot chamber 12, the plenum being fed by hot air through a tube 6 and supporting a plurality of nozzles 7 of suitable size and number.

The group of nozzles 7 produces a supporting air bed which forms an extension of the glass conveyor formed by rollers 4. This air bed also has a flat surface.

A bearing frame 8 supports the plenum 5 within the hot chamber 12. The frame 8 has two hinges 9 close to the outlet from the furnace 1 and, on the opposite side, two mechanical jacks 10, moved by means of motor 11, which can incline the surface of the plenum by 1°–2° with respect to the horizontal.

Figure 3:
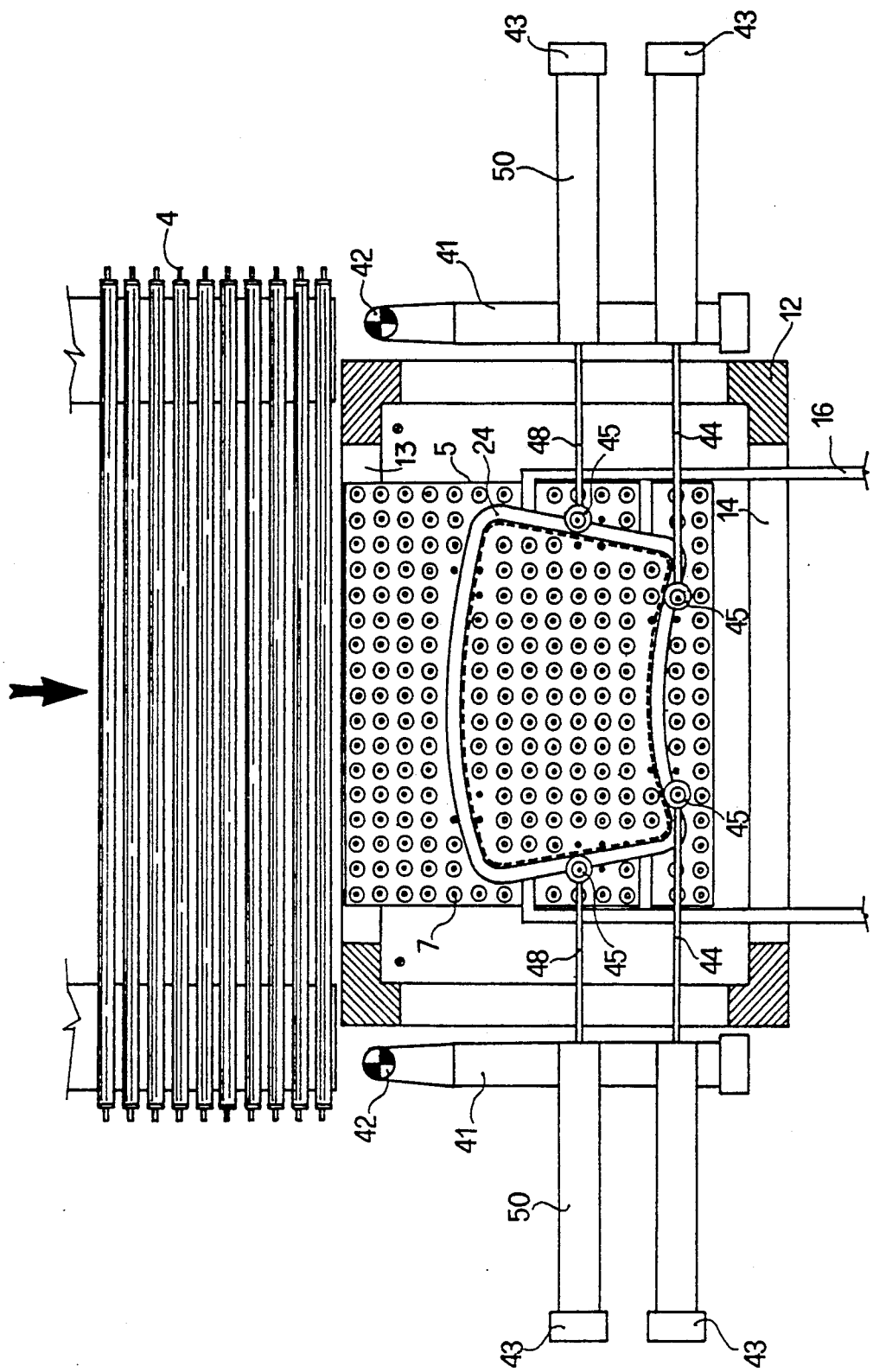
FIG. 3 is a top view of a glass support plane and stops.

When the sheet of glass V is on the air bed, the plenum 5 inclines downward, assisting the glass in sliding and giving perfect adhesion of the edge of the glass against ceramic wheels 45 of reference stops 50 (see FIG. 3).

The plenum 5, preferably made of stainless steel, has on its upper plate 51, a plurality of threaded bores 52, arranged so as not to compromise the resistance of the plate, but at the same time allowing optimum arrangement of the nozzles according to the geometrical form of the sheet of glass to be shaped.

Each of the nozzles 7 has a first threaded cylindrical portion 53 to allow it to be screwed into the plate 51 of the plenum 5, a second cylindrical portion 54 and a third portion 55 with a substantially frusto-conical shape, as shown in FIG. 4. The nozzles 7 are preferably made of stainless steel, given that the temperature in the hot chamber of the shaping station is between 600° and 700° C.

According to a preferred embodiment of the invention the internal geometry of the nozzle, capable of allowing a suitable passage of air, is made up of a first converging channel 56, a successive cylindrical portion with a calibrated cross-section 57, a cylindrical channel 58 with a larger diameter than the preceding portion, a cylindrical channel 59 with a larger diameter than the preceding channel 58 and a final frusto-conical part 60 to provide final slowing of the fluid.

The cylindrical portion 57 has preferably has a diameter from 2 to 8 millimeters.

The diameter of the outlet section of the nozzle 7 is preferably 40 to 100 millimeters.

The nozzles 7 are arranged on the plenum 5 at the vertexes of a square mesh with a pitch such as to guarantee the desired air discharge space.

In the areas left without nozzles to allow passage of a shaping ring 24, the bores 52 are closed by means of threaded plugs 61.

On the side walls of the hot chamber openings are formed which are necessary for maintenance and inspection purposes. Furthermore an opening 13 allows the glass to enter the chamber and another opening 14 allows the glass to leave it.

To avoid heat losses, the opening 14 is provided with a drop gate 15 which opens in cycle to permit the entry and exit of a shuttle 16.

The upper shaping mold 17 is formed by a full mold 18, shaped and provided with a perforated plane, so as to produce a vacuum effect resulting in a suction of the glass V, the vacuum being produced using a Venturi system, not shown in the figure, which ejects the air sucked up through a tube 25.

The mold 17 is anchored to two support rods 19 which extend out of the hot chamber 12 through passages 20 formed in the refractory material of the ceiling thereof, and which are connected to a mobile frame 21, which is moved vertically by an operating mechanism 23 and a digitally controlled motor 22.

The vertical movement of the upper mold positions the mold 17 so as to be registered in correspondence with the shaping ring 24.

An operating mechanism made up of chains 26 and a motor-winch 27 is operable to lift the mobile part of the mold, so as to facilitate its extraction when changing equipment.

The shuttle 16 supports the shaping ring 24 and moves in a vertical manner inside the hot chamber 12 and in a reciprocating horizontal manner to convey the ring 24 from the hot chamber to the tempering station 3.

A support structure 29 supports driving screws 30, to which longitudinal guides 28 with an upturned V-shaped cross section are fixed.

Wheels 31 are engaged with the V-shaped guides 28 and support the shuttle 16, which is made up of two independent side sections kept parallel by the engagement of the driving screws 30.

A vertically mobile frame 32 is connected to a wheel 33 which is destined to be engaged in the elevator 34; a rack guided system 35 with a parallel bar prevents oscillation during lowering.

The elevator 34 is a device which allows the mold-bearing element (or shuttle) 16 to undergo vertical movement. The wheel 33 rests on the elevator rod 34, and a motor 37 moves the elevator 34 vertically by means of a rack 36.

The reciprocating horizontal movement of the mold-bearing shuttle 16 is generated by means of driving screws 30 engaged with roller wheels 38 connected to the side sections of the shuttle itself and pressing elastically on the thread of the screws 30. The driving screws are two in number, one on each side of the machine, and they are counter-rotating and have right- and left-handed threads, respectively.

The screws 30 are supported at their ends by self-aligning roller bearings, not shown in the figures.

The screws 30 are activated by means of a toothed belt gear 39.

The group of stops 50 receives the glass V when it leaves the furnace, slowing said the down progressively as it rests on the air bed formed by the nozzles 7.

Two support structures 41, one on each side of the machine, hinged at 42, support carriages 43 which are moved by a digitally controlled motor not shown in the figures.

The stop rods 44 and 48 have, at the ends which contact the glass V, the ceramic wheels 45. The rods 44 themselves are slightly flexible, so as to adapt to the position of the plane 5 which can be inclined by 1 or 2 degrees.

The sheet of glass V is heated to its softening point in the furnace 1 as it is carried by the roller bed 4. Subsequently, after leaving the roller bed, conveyed on an air hearth bed it is delivered to the first pair of rods 44 which, extending from the carriages 43, come into contact with the front edge of the sheet of glass itself and slow it down until it stops in a suitable position defined by the shaping ring positioned below the floating plane.

A second pair of rods 48 extending from the carriages 43 comes into contact with the side edge of the sheet of glass and centers it in correspondence with a position defined by the shaping ring 24, which is in a waiting position below the floating level of the glass.

At the moment in which the sheet of glass has been finally centered, the ring 24 is raised to raise the sheet of glass V and convey it towards the shaping mold 18 until it is at a distance such as to allow the vacuum created by the mold by means of its perforated plane to attract the sheet of glass V, which thus continues to bend, taking on the desired shape.

When shaping has been completed, the mold 18 releases the sheet of glass back onto the same ring 24, which moves rapidly to the tempering station 3 which contains opposite upper nozzles 46 and lower nozzles 47 that perform quenching of the shaped glass V, and which preferably also performs unloading of the glass, making use of a difference in pressure between the upper and lower nozzles which pushes the shaped glass upward causing it to be detached from the ring 24.

Following this the shaping ring 24 returns to the shaping station 2, positioning itself once more under the air hearth bed to await the arrival of the next sheet of glass to be shaped.

We claim:

1. An apparatus for shaping and tempering a glass sheet for use in a motor vehicle, comprising:
    a heating station including a furnace and a roller conveyor extending horizontally through said furnace for feeding the glass sheet in a downstream direction through said furnace along a predetermined path;
    a shaping station positioned adjacent and downstream of said heating station and including an air bed means for supporting the glass sheet at a floating level on an air bed in a position downstream of said roller conveyor along said predetermined path, and an upper shaping mold spaced above said air bed means and said floating level and comprising a perforated shaping surface and a vacuum means for creating suction through said perforated shaping surface to attract the glass sheet thereto;
    a tempering station positioned downstream of said shaping station and including tempering nozzle means for rapidly cooling the glass sheet;
    a glass supporting ring for supporting the glass sheet;
    ring moving means for moving said glass supporting ring vertically from a position below said floating level toward said perforated shaping surface of said upper shaping mold, and for moving said glass supporting ring horizontally from said shaping station toward said tempering station; and
    wherein said air bed means comprises an air plenum and a plurality of upwardly directed air nozzles individually removably supported by said plenum and in fluid communication with said plenum to allow air to be supplied through said nozzles from said plenum to form said air bed, said plenum having a ring-shaped area devoid of said nozzles, said ring-shaped area corresponding to a shape of said glass supporting ring to be positioned in said ring-shaped area below said floating level.

2. An apparatus as recited in claim 1, wherein
    each of said air nozzles is mounted to said plenum by screw threads and includes an upwardly converging channel in communication with said plenum, a first cylindrical portion extending from said upwardly converging channel and having a first predetermined cross section for causing a substantially constant air flow rate, a second cylindrical portion extending from said first cylindrical portion and having a second predetermined cross section larger than said first predetermined cross section, and a final frusto-conically shaped portion extending from said second cylindrical portion for reducing the air flow rate and forming a portion of said air bed.

3. An apparatus as recited in claim 2, wherein
    each of said air nozzles further includes an upwardly diverging portion between said first and second cylindrical portions.

4. An apparatus as recited in claim 1, wherein
    said shaping section further includes a frame supporting said plenum, a first end of said frame being mounted on a pair of hinges and a second end of said frame being mounted on mechanical jacks for allowing said plenum and said air bed to be inclined downwardly in said downstream direction.

5. An apparatus as recited in claim 4, wherein
    said shaping section further includes a stop means for stopping the glass sheet in a predetermined position on said air bed aligned above said glass support ring when said glass support ring is in said position below said floating level, said stop means comprising a first pair of reference stops, each including a cylinder and a rod extending therefrom to contact a front edge of the glass sheet, and a second pair of reference stops, each including a cylinder and a rod extending therefrom to contact a side edge of the glass sheet.

6. An apparatus as recited in claim 1, wherein
    each of said nozzles includes a portion having a cross-sectional diameter of 2 to 8 millimeters.

7. An apparatus as recited in claim 1, wherein
    each of said nozzles has an air outlet with a cross-sectional diameter of 40 to 100 millimeters.

8. An apparatus as recited in claim 1, wherein
    said air bed means includes a means for supplying air to said air nozzles at a pressure of 50 to 100 millibar.

9. An apparatus as recited in claim 1, wherein
    said plenum includes a plurality of threaded nozzle engaging means for removably engaging said plurality of air nozzles and fluidically communicating said nozzles with said plenum.

10. An apparatus as recited in claim 9, further comprising
    threaded plug means, removably engaged with ones of said threaded nozzle engaging means disposed in said ring-shaped area, for preventing air from escaping from said plenum through said ones of said threaded nozzle engaging means disposed in said ring-shaped area.

11. An apparatus as recited in claim 10, wherein
    said threaded nozzle engaging means respectively comprise internally threaded bores;
    each of said nozzles includes an externally threaded cylindrical portion engageable in one of said bores; and
    each of said threaded plug means comprises an externally threaded plug engageable in one of said bores.

* * * * *

UNITED STATES PATENT AND TRADEMARK OFFICE
CERTIFICATE OF CORRECTION

PATENT NO. : 5,330,549
DATED : July 19, 1994
INVENTOR(S) : Giovanni CARLOMAGNO et al.

It is certified that error appears in the above-identified patent and that said Letters Patent is hereby corrected as shown below:

On the cover page, in item [73], "Società Italiana - SIV - S.p.A." should read --Società Italiana Vetro - SIV - S.p.A.--.

Signed and Sealed this

Fourteenth Day of March, 1995

Attest:

BRUCE LEHMAN

Attesting Officer

Commissioner of Patents and Trademarks